Aug. 7, 1923.
E. O. DI GENOVA
TIGHTENING DEVICE FOR DRIVING BELTS
Filed July 11, 1922
1,464,411
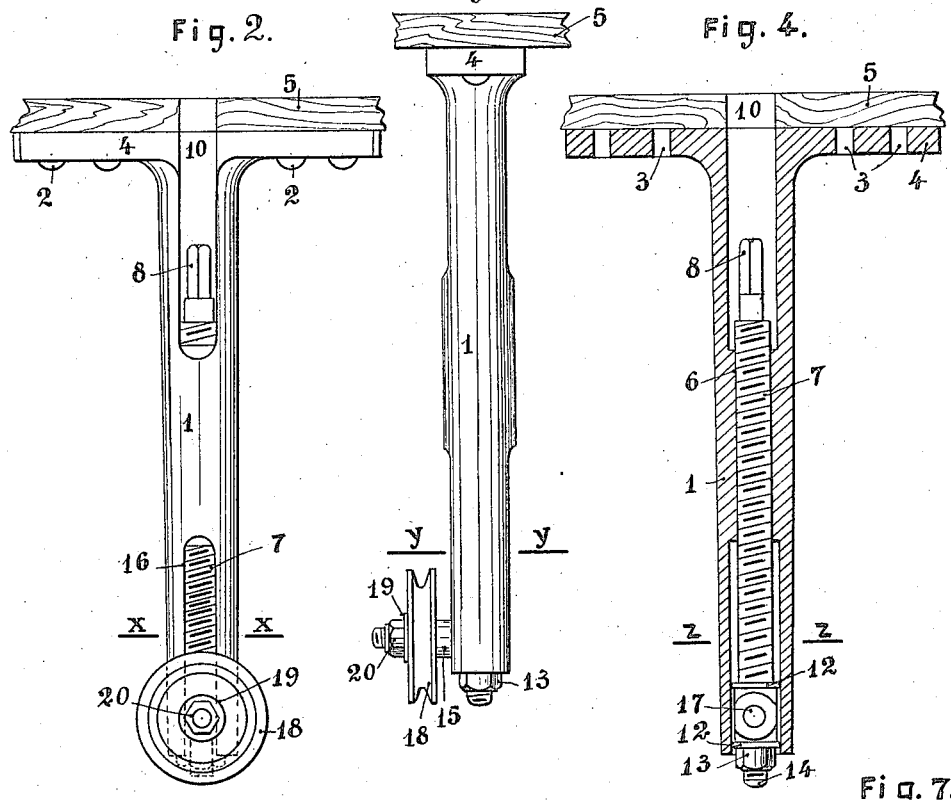
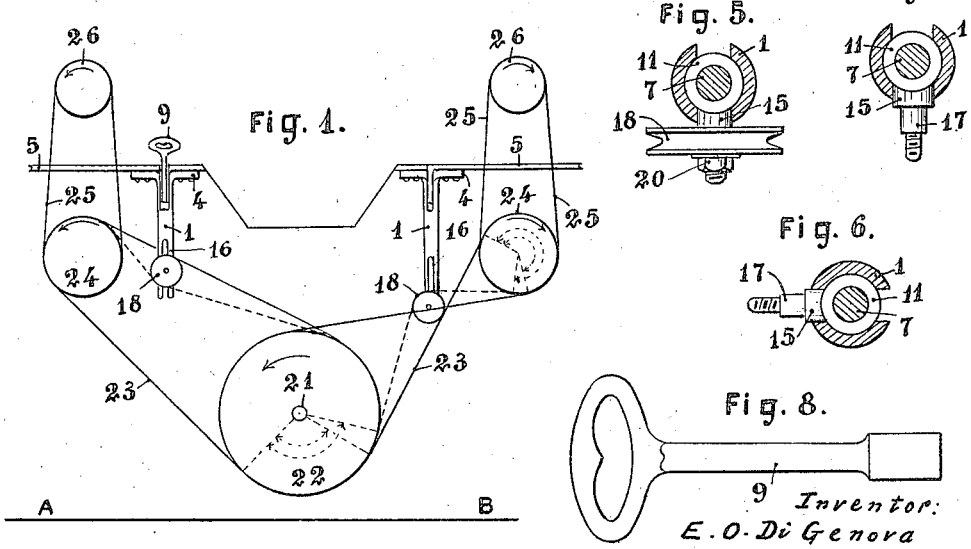
Inventor:
E. O. Di Genova
By Langner, Parry, Card & Langner
Attys Patented Aug. 7, 1923.

1,464,411

UNITED STATES PATENT OFFICE.

EGIDIO OTTAVIO DI GENOVA, OF ROME, ITALY.

TIGHTENING DEVICE FOR DRIVING BELTS.

Application filed July 11, 1922. Serial No. 574,160.

*To all whom it may concern:*

Be it known that I, EGIDIO OTTAVIO DI GENOVA, a subject of the King of Italy, residing at Rome, in the Kingdom of Italy, have invented certain new and useful Improvements in Tightening Devices for Driving Belts, of which the following is a specification, reference being had therein to the accompanying drawing.

This invention concerns improvements in adjustable tightening device for driving belts especially designed for small machines, as sewing machines, embroidery machines. eyeleting machines and the like driven by mechanical power.

Said machines have been greatly developed and are largely used in factories where they are driven by a main shaft with which they are connected with driving belts. It happens however that said belts owing to the continuous tension to which they are subjected, in course of time, get slackened and lengthened, thus preventing a regular transmission of the movement.

The workman in charge of the machine is therefore often compelled to stop the machine and effect the disconnection and the shortening of the driving belt and then to wind it again with great loss of time.

The tightening device according to my invention has the object of preventing this loss of time and allows to regulate in an easy manner and without loss of time the tension of the driving belt, without having to slip it off and this by turning a key which shifts the tightening pulley whereon the driving belt is guided. By causing the pulley to shift either towards or away from the belt, by turning the key in the one or the other direction, the tension of the belt is either increased or diminished, and this may be carried out without a breakage of the work.

In the enclosed drawing showing a form of execution of the tightening device according to this invention:

Fig. 1 is a general schematical view of a plant for the movement of two machines to which the device has been applied.

Figs. 2, 3 and 4 show respectively a front view, a side view and a diametral section of the device.

Figs. 5, 6 and 7 are transversal sections according to lines XX, YY, ZZ of Figs. 2, 3 and 4 respectively.

Fig. 8 shows the controlling key.

As it may be seen in the drawing the device (Figs. 1, 2 and 3), consists of a sleeve 1 which by means of screws 2, passing through holes 3 of a foot 4 wherewith it is provided, is fixed to the working plane 5 of the machine to which it is applied.

The sleeve 1 is provided with a thread for a certain portion of its length 6 and in this part is screwed a screw 7 whose upper end 8 is square or polygonal for receiving the key 9, Fig. 8, which is introduced through a hole 10 of the working plane and by means of which the screw may be turned in order to lift or lower it.

The lower end of the screw stem 7 bears a revolving block 11 held between two washers 12 by a nut 13 and a splint-pin 14. The block 11 bears a radial extension 15 coming out from a slot 16 provided in the lower part of the sleeve 1 and bearing a pivot 17 on which is fitted loose the pulley 18 fastened to the pivot by means of a washer 19 and a nut 20.

It will be understood that when the screw is turned either one way or the other the pulley 18 is raised or lowered while the extension 15 slides up or down guided in the slot 16.

In Fig. 1 is shown how matters are arranged when there is, for instance, a driving shaft 22 placed near the floor AA, below the working plane 5, 5 of two sets of sewing machines on the right and left side of the driving shaft itself.

The driving shaft bears a pulley 22 whereon are applied the driving belts 23 imparting motion to the pulleys 24 of both machines, one stretch of the belts 23 passing over, or under, the tightening pulley 18. From the shaft bearing the pulley 24 by means of a belt 25 the movement is transmitted to the pulley 26 of the work shaft.

It will be noticed how by lifting or lowering the pulleys 18 may be regulated the tension of the driving belts 23. Besides, according to the way the belt 23 is laid on the pulley 18 the angle enveloped by the belts upon the pulleys 22, 24 may be increased or decreased as shown by the continuous and broken lines in Fig. 1.

Although in the drawing the device has been shown applied to the lower face of the working table, still it will be understood that, according to the different positions which the driving shaft may have, it will be differently placed, by modifying, when necessary, the shape of the attachment foot.

Claims—

1. A tightening device of the character described, comprising, a work plane, a support connected to the plane, a pulley carried by the support, the support being in the form of a sleeve, a central screw thread in the support, a screw received by the screw thread, a pivot carried by the pulley, the lower end of the screw being connected to the pivot and the upper end of the screw being formed to receive a key, and an aperture in the work plane, for receiving a key.

2. A device according to claim 1, said support having a slot on its lower end, said screw bearing a block having a radial extension whereby to connect its screw to the said pivot, the radial extensions being slidable in the slot, to allow raising and lowering of the pulley by means of the screw.

In testimony whereof I affix my signature.

EGIDIO OTTAVIO DI GENOVA.

Witnesses:
LEFFERN LABOUETTA,
ANTONNE LABOUETTA.